US008244528B2

(12) United States Patent
Niemistö et al.

(10) Patent No.: US 8,244,528 B2
(45) Date of Patent: Aug. 14, 2012

(54) METHOD AND APPARATUS FOR VOICE ACTIVITY DETERMINATION

(75) Inventors: Riitta Elina Niemistö, Tampere (FI); Päivi Marianna Valve, Tampere (FI)

(73) Assignee: Nokia Corporation, Espoo (FI)

( * ) Notice: Subject to any disclaimer, the term of this patent is extended or adjusted under 35 U.S.C. 154(b) by 901 days.

(21) Appl. No.: 12/109,861

(22) Filed: Apr. 25, 2008

(65) Prior Publication Data

US 2009/0271190 A1 Oct. 29, 2009

(51) Int. Cl.
*G10L 15/20* (2006.01)

(52) U.S. Cl. ........ 704/233; 704/210; 704/208; 704/214; 704/215; 704/226

(58) Field of Classification Search .................. 704/233, 704/208, 210, 214, 215, 226
See application file for complete search history.

(56) References Cited

U.S. PATENT DOCUMENTS

| | | | | |
|---|---|---|---|---|
| 5,123,887 | A | 6/1992 | Shimura | 493/34 |
| 5,242,364 | A | 9/1993 | Lehmann | 493/8 |
| 5,276,765 | A | 1/1994 | Freeman et al. | 395/2 |
| 5,383,392 | A | 1/1995 | Kowalewski et al. | 101/183 |
| 5,459,814 | A | 10/1995 | Gupta et al. | 395/2.42 |
| 5,657,422 | A | 8/1997 | Janiszewski et al. | 395/2.37 |
| 5,687,241 | A | 11/1997 | Ludvigsen | 381/68.4 |
| 5,749,067 | A | 5/1998 | Barrett | 704/233 |
| 5,793,642 | A | 8/1998 | Frisch et al. | 364/490 |
| 5,822,718 | A | 10/1998 | Bakis et al. | 702/180 |
| 5,963,901 | A | 10/1999 | Vahatalo et al. | 704/233 |
| 6,023,674 | A | 2/2000 | Mekuria | 704/233 |
| 6,182,035 | B1 | 1/2001 | Mekuria | 704/236 |
| 6,427,134 | B1 | 7/2002 | Garner et al. | 704/233 |
| 6,449,593 | B1 | 9/2002 | Valve | 704/233 |
| 6,556,967 | B1 | 4/2003 | Nelson et al. | 704/233 |
| 6,574,592 | B1 | 6/2003 | Nankawa et al. | 704/206 |
| 6,647,365 | B1 | 11/2003 | Faller | 704/200.1 |
| 6,675,125 | B2 | 1/2004 | Bizjak | 702/179 |

(Continued)

FOREIGN PATENT DOCUMENTS

EP 0 335 521 10/1989

(Continued)

OTHER PUBLICATIONS

Hoffman, Michael W., et al., "GSC-Based Spatial Voice Activity Detection for Enhanced Speech Coding in the Presence of Competing Speech", IEEE Transactions on Speech and Audio Processing, vol. 9, No. 2, Mar. 2001, pp. 175-179.

(Continued)

*Primary Examiner* — Qi Han
(74) *Attorney, Agent, or Firm* — Harrington & Smith

(57) ABSTRACT

In accordance with an example embodiment of the invention, there is provided an apparatus for detecting voice activity in an audio signal. The apparatus comprises a first voice activity detector for making a first voice activity detection decision based at least in part on the voice activity of a first audio signal received from a first microphone. The apparatus also comprises a second voice activity detector for making a second voice activity detection decision based at least in part on an estimate of a direction of the first audio signal and an estimate of a direction of a second audio signal received from a second microphone. The apparatus further comprises a classifier for making a third voice activity detection decision based at least in part on the first and second voice activity detection decisions.

20 Claims, 3 Drawing Sheets

U.S. PATENT DOCUMENTS

| | | | | |
|---|---|---|---|---|
| 6,810,273 | B1 | 10/2004 | Mattila et al. | 455/570 |
| 7,203,323 | B2 | 4/2007 | Tashev | 381/92 |
| 2001/0056291 | A1 | 12/2001 | Zilberman et al. | 607/57 |
| 2002/0103636 | A1 | 8/2002 | Tucker et al. | 704/205 |
| 2002/0138254 | A1 | 9/2002 | Isaka et al. | 704/208 |
| 2003/0228023 | A1* | 12/2003 | Burnett et al. | 381/92 |
| 2004/0042626 | A1* | 3/2004 | Balan et al. | 381/110 |
| 2004/0117176 | A1 | 6/2004 | Kandhadai et al. | 704/223 |
| 2004/0122667 | A1 | 6/2004 | Lee et al. | 704/233 |
| 2005/0108004 | A1 | 5/2005 | Otani et al. | 704/205 |
| 2005/0147258 | A1 | 7/2005 | Myllyla et al. | 381/71.11 |
| 2006/0053007 | A1 | 3/2006 | Niemisto | 704/233 |
| 2007/0136053 | A1 | 6/2007 | Ebenezer | 704/208 |
| 2008/0199024 | A1 | 8/2008 | Nakadai et al. | 381/92 |
| 2008/0317259 | A1* | 12/2008 | Zhang et al. | 381/92 |
| 2009/0089053 | A1* | 4/2009 | Wang et al. | 704/233 |

FOREIGN PATENT DOCUMENTS

| | | | |
|---|---|---|---|
| EP | 0 734 012 | A2 | 9/1996 |
| EP | 0734012 | A2 | 9/1996 |
| EP | 1 453 349 | A2 | 9/2004 |
| WO | 01/37265 | A1 | 5/2001 |
| WO | WO 01/37265 | A1 | 5/2001 |
| WO | WO 2007/013525 | A1 | 2/2007 |
| WO | 2007/138503 | A1 | 12/2007 |
| WO | WO 2007/138503 | A1 | 12/2007 |

OTHER PUBLICATIONS

Widrow, Bernard, "Adaptive Noise Cancelling: Principles and Applications", Proceedings of the IEEE, vol. 63, No. 12, Dec. 1975, pp. 1692-1716.

International Search Report and Written Opinion, received in correspnding PCT Application No. PCT/IB2009/005374, issued by National Board of Patents and Registration of Finland (ISA), Aug. 12, 2009, 14 pages.

Marzinzik, et al., "Speech Pause Detection for Noise Spectrum Elimination by Tracking Power Envelope Dynamics", IEEE Transaction Speech and Audio Processing, vol. 10, No. 2, (Feb. 2002), (pp. 109-118).

Buck, et al., "Self-Calibrating Microphone Arrays for Speech Signal Acquisition: A Systematic Approach", vol. 86, Issue 6, (Jun. 2006), (pp. 1230-1238).

Hansler, et al., Acoustic Echo and Noise Control: A Practical Approach, (2004), (1 page).

Furui, et al., Advances in Speech Signal Processing, (1992), (4 pages).

3GPP TS 26.094 V5.0.0 (Jun. 2002), Technical Specification, 3rd Generation Partnership Project; Technical Specification Group Services and Systems Aspects; Mandatory Speech Codec Speech Processing Functions; Adaptive Multi-Rate (AMR) Speech Codec; Voice Activity Detector (VAD) (Release 5), (26 pages).

3G TS 26.094 V3.0.0 (Oct. 1999), Technical Specification, 3rd Generation Partnership Project; Technical Specification Group Services and Systems Aspects; Mandatory Speech Codec Speech Processing Functions (AMR) Speech Codec; Voice Activity Detector (VAD) (29 pages).

Gray et al., IEEE Transactions on Acoustics, Speech and Signal Processing, vol. ASSP-22, No. 3, Jun. 1974, "A Spectral-Flatness Measure for Studying the Autocorrelation Method of Linear Prediction of Speech Analysis", (pp. 207-217).

Prased et al., "Comparison of Voice Activity Detection Algorithms for VoIP", Proceedings of the 7th International Symposium on Computers and Communications, (2002), (pp. 530-535).

Zhibo et al., "A Knowledge Based Real-Tim Speech Detector for Microphone Array Videoconferencing System", IEEE vol. 1, (Aug. 26, 2002), (pp. 350-353).

Hoffman, et al , "GCS-Based Spatial Voice Activity Detection for Enhanced Speech Coding in the Presence of Competing Speech", IEEE Transactions on Speech and Audio Processing, vol. 9, No. 2, (Mar. 2001), (pp. 175-179).

Widrow, Bernard, "Adaptive Noise Cancelling: Principals and Applications", Proceedings of the IEEE, vol. 63, No. 12 (Dec. 1975), (pp. 1692-1716).

Gazor, et al., "A Soft Voice Activity Detector Based on a Laplacian-Gaussian Model", IEEE Transaction Speech Audio Processing, vol. 11, No. 5, (Sep. 2003), (pp. 498-505).

Teutsch et al., "An Adaptive Close-Talking Microphone Array", (Oct. 21-24, 2001), (4 pages).

File History for Related (abandoned) U.S. Appl. No. 11/214,454, filed Aug. 29, 2005.

Office Action Received in related U.S. Appl. No. 12/109,861, dated May 5, 2011, (12 pages).

International Search Report and Written Opinion received in corresponding PCT Application No. PCT/FI2009/050314 dated Sep. 3, 2009, (10 pages).

Extended European Search Report received for corresponding European Patent Application No. 05775189.3, dated Nov. 3, 2008, (7 pages).

International Search Report and Written Opinion received in corresponding PCT Application No. PCT/FI2009/050302dated Nov. 21, 2005, (11 pages).

International Search Report and Written Opinion received in corresponding PCT Application No. PCT/IB2009/005374, dated Aug. 12, 2009, (14 pages).

Ivan Tashev, "Gain Self-Calibration Procedure for Microphone Arrays", in Proceedings of International Conference for Multimedia and Expo ICME 2004, Taipei, Taiwan, Jun. 2004.

T. P. Hua et al., "A New Self-Calibration Technique for Adaptive Microphone Arrays", IWAENC 2005, pp. 237-240 Sep. 2005.

* cited by examiner

METHOD AND APPARATUS FOR VOICE ACTIVITY DETERMINATION

RELATED APPLICATIONS

This application relates to U.S. Provisional Patent Application No. 61/125,470, titled "Electronic Device Speech Enhancement", filed concurrently herewith, which is hereby incorporated by reference in its entirety.

TECHNICAL FIELD

The present application relates generally to speech and/or audio processing, and more particularly to determination of the voice activity in a speech signal. More particularly, the present application relates to voice activity detection in a situation where more than one microphone is used.

BACKGROUND

Voice activity detectors are known. Third Generation Partnership Project (3GPP) standard TS 26.094 "Mandatory Speech Codec speech processing functions; AMR speech codec; Voice Activity Detector (VAD)" describes a solution for voice activity detection in the context of GSM (Global System for Mobile Systems) and WCDMA (Wide-Band Code Division Multiple Access) telecommunication systems. In this solution an audio signal and its noise component is estimated in different frequency bands and a voice activity decision is made based on that. This solution does not provide any multi-microphone operation but speech signal from one microphone is used.

SUMMARY

Various aspects of the invention are set out in the claims.

In accordance with an example embodiment of the invention, there is provided an apparatus for detecting voice activity in an audio signal. The apparatus comprises a first voice activity detector for making a first voice activity detection decision based at least in part on the voice activity of a first audio signal received from a first microphone. The apparatus also comprises a second voice activity detector for making a second voice activity detection decision based at least in part on an estimate of a direction of the first audio signal and an estimate of a direction of a second audio signal received from a second microphone. The apparatus further comprises a classifier for making a third voice activity detection decision based at least in part on the first and second voice activity detection decisions.

In accordance with another example embodiment of the present invention, there is provided a method for detecting voice activity in an audio signal. The method comprises making a first voice activity detection decision based at least in part on the voice activity of a first audio signal received from a first microphone, making a second voice activity detection decision based at least in part on an estimate of a direction of the first audio signal and an estimate of a direction of a audio signal received from a second microphone and making a third voice activity detection decision based at least in part on the first and second voice activity detection decisions.

In accordance with a further example embodiment of the invention, there is provided a computer program comprising machine readable code for detecting voice activity in an audio signal. The computer program comprises machine readable code for making a first voice activity detection decision based at least in part on the voice activity of a first audio signal received from a first microphone, machine readable code for making a second voice activity detection decision based at least in part on an estimate of a direction of the first audio signal and an estimate of a direction of a audio signal received from a second microphone and machine readable coded for making a third voice activity detection decision based at least in part on the first and second voice activity detection decisions.

BRIEF DESCRIPTION OF THE DRAWINGS

For a more complete understanding of example embodiments of the present invention, the objects and potential advantages thereof, reference is now made to the following descriptions taken in connection with the accompanying drawings in which.

DETAILED DESCRIPTION OF THE DRAWINGS

An example embodiment of the present invention and its potential advantages are best understood by referring to FIGS. 1 through 5 of the drawings.

Figure 1:
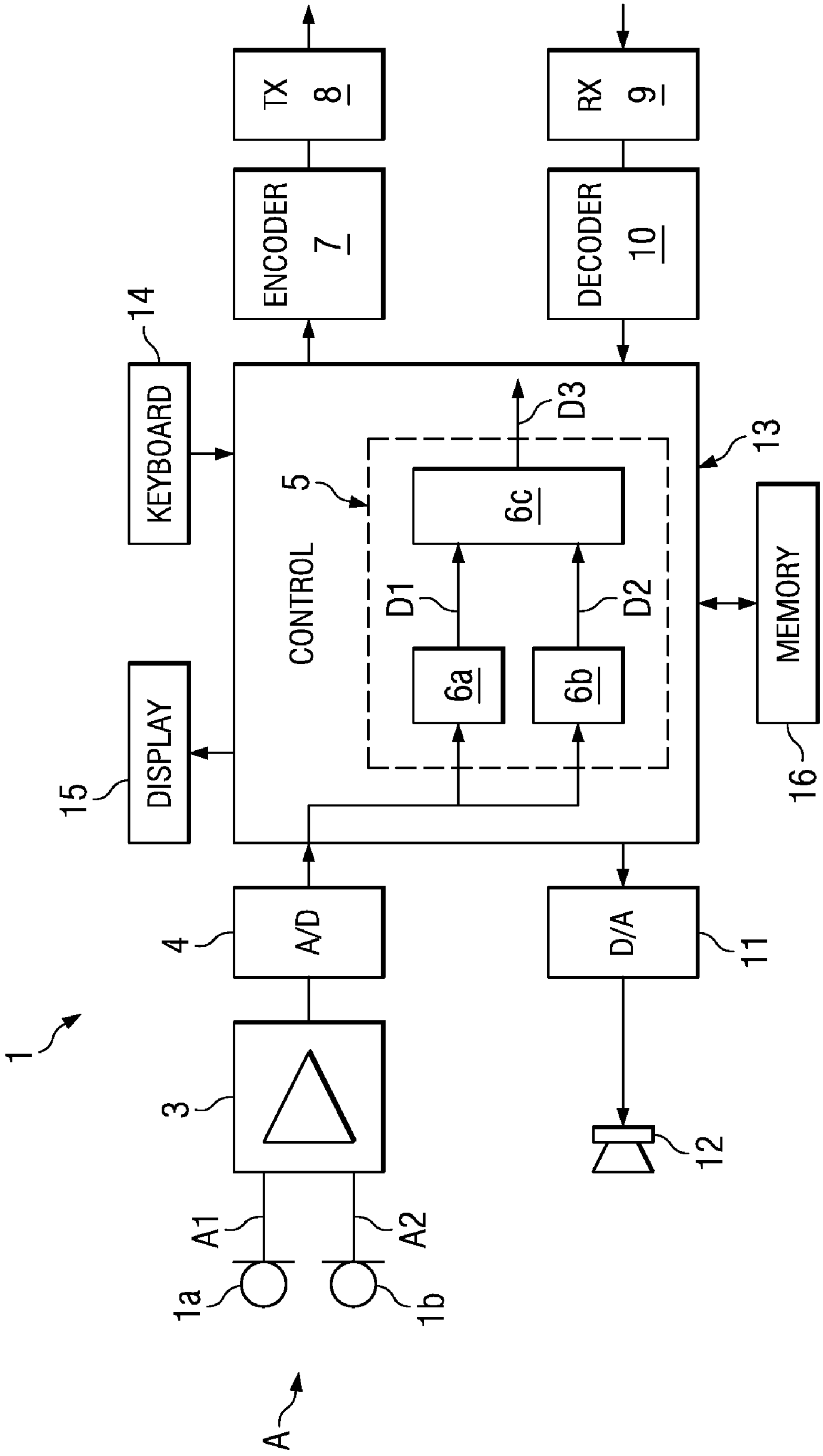
FIG. 1 shows a block diagram of an apparatus according to an embodiment of the present invention.

FIG. 1 shows a block diagram of an apparatus according to an embodiment of the present invention, for example an electronic device 1. In embodiments of the invention, device 1 may be a portable electronic device, such as a mobile telephone, personal digital assistant (PDA) or laptop computer and/or the like. In alternative embodiments, device 1 may be a desktop computer, fixed line telephone or any electronic device with audio and/or speech processing functionality.

Referring in detail to FIG. 1, it will be noted that the electronic device 1 comprises at least two audio input microphones 1*a*, 1*b* for inputting an audio signal A for processing. The audio signals A1 and A2 from microphones 1*a* and 1*b* respectively are amplified, for example by amplifier 3. Noise suppression may also be performed to produce an enhanced audio signal. The audio signal is digitised in analog-to-digital converter 4. The analog-to-digital converter 4 forms samples from the audio signal at certain intervals, for example at a certain predetermined sampling rate. The analog-to-digital converter may use, for example, a sampling frequency of 8 kHz, wherein, according to the Nyquist theorem, the useful frequency range is about from 0 to 4 kHz. This usually is appropriate for encoding speech. It is also possible to use other sampling frequencies than 8 kHz, for example 16 kHz when also higher frequencies than 4 kHz could exist in the signal when it is converted into digital form.

The analog-to-digital converter 4 may also logically divide the samples into frames. A frame comprises a predetermined number of samples. The length of time represented by a frame is a few milliseconds, for example 10 ms or 20 ms.

The electronic device 1 may also have a speech processor 5, in which audio signal processing is at least partly performed. The speech processor 5 is, for example, a digital signal processor (DSP). The speech processor may also perform other operations, such as echo control in the uplink (transmission) and/or downlink (reception) directions of a wireless communication channel. In an embodiment, the speech processor 5 may be implemented as part of a control block 13 of the device 1. The control block 13 may also implement other controlling operations. The device 1 may also comprise a keyboard 14, a display 15, and/or memory 16.

In the speech processor 5 the samples are processed on a frame-by-frame basis. The processing may be performed at least partly in the time domain, and/or at least partly in the frequency domain.

In the embodiment of FIG. 1, the speech processor 5 comprises a spatial voice activity detector (SVAD) 6*a* and a voice activity detector (VAD) 6*b*. The spatial voice activity detector 6*a* and the voice activity detector 6*b*, examine the speech samples of a frame to form respective decision indications D1 and D2 concerning the presence of speech in the frame. The SVAD 6*a* and VAD 6*b* provide decision indications D1 and D2 to classifier 6*c*. Classifier 6*c* makes a final voice activity detection decision and outputs a corresponding decision indication D3. The final voice activity detection decision may be based at least in part on decision signals D1 and D2. Voice activity detector 6*b* may be any type of voice activity detector. For example, VAD 6*b* may be implemented as described in 3GPP standard TS 26.094 (Mandatory speech codec speech processing functions; Adaptive Multi-Rate (AMR) speech codec; Voice Activity Detector (VAD)). VAD 6*b* may be configured to receive either one or both of audio signals A1 and A2 and to form a voice activity detection decision based on the respective signal or signals.

Several operations within the electronic device may utilize the voice activity decision indication D3. For example, a noise cancellation circuit may estimate and update a background noise spectrum when voice activity decision indication D3 indicates that the audio signal does not contain speech.

The device 1 may also comprise an audio encoder and/or a speech encoder, 7 for source encoding the audio signal, as shown in FIG. 1. Source encoding may be applied on a frame-by-frame basis to produce source encoded frames comprising parameters representative of the audio signal. A transmitter 8 may further be provided in device 1 for transmitting the source encoded audio signal via a communication channel, for example a communication channel of a mobile communication network, to another electronic device such as a wireless communication device and/or the like. The transmitter may be configured to apply channel coding to the source encoded audio signal in order to provide the transmission with a degree of error resilience.

In addition to transmitter 8, electronic device 1 may further comprise a receiver 9 for receiving an encoded audio signal from a communication channel. If the encoded audio signal received at device 1 is channel coded, receiver 9 may perform an appropriate channel decoding operation on the received signal to form a channel decoded signal. The channel decoded signal thus formed is made up of source encoded frames comprising, for example, parameters representative of the audio signal. The channel decoded signal is directed to source decoder 10. The source decoder 10 decodes the source encoded frames to reconstruct frames of samples representative of the audio signal. The frames of samples are converted to analog signals by a digital-to-analog converter 11. The analog signals may be converted to audible signals, for example, by a loudspeaker or an earpiece 12.

Figure 2:
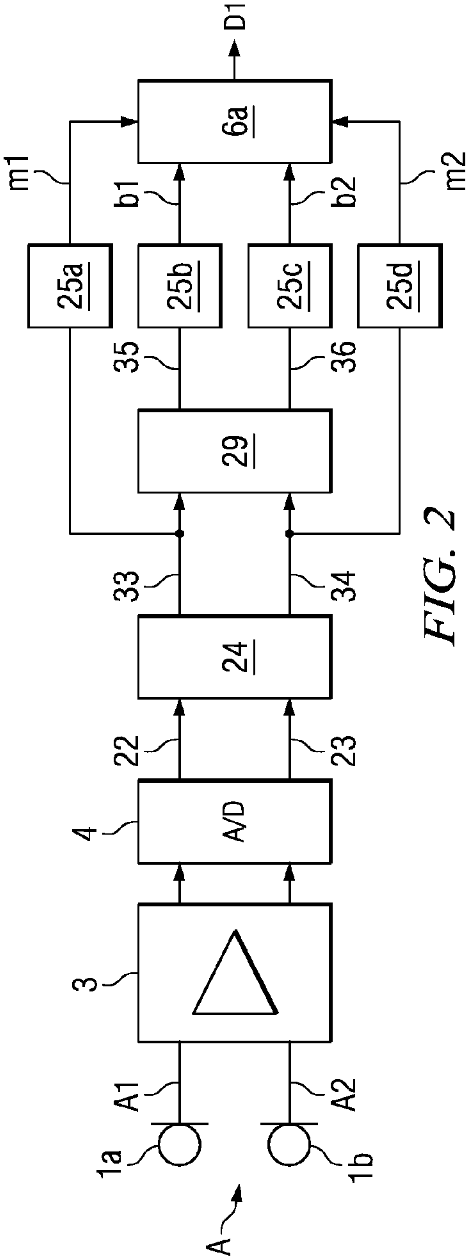
FIG. 2 shows a more detailed block diagram of the apparatus of FIG. 1.

FIG. 2 shows a more detailed block diagram of the apparatus of FIG. 1. In FIG. 2, the respective audio signals produced by input microphones 1*a* and 1*b* and respectively amplified, for example by amplifier 3 are converted into digital form (by analog-to-digital converter 4) to form digitised audio signals 22 and 23. The digitised audio signals 22, 23 are directed to filtering unit 24, where they are filtered. In FIG. 2, the filtering unit 24 is located before beam forming unit 29, but in an alternative embodiment of the invention, the filtering unit 24 may be located after beam former 29.

The filtering unit 24 retains only those frequencies in the signals for which the spatial VAD operation is most effective. In one embodiment of the invention a low-pass filter is used in filtering unit 24. The low-pass filter may have a cut-off frequency e.g. at 1 kHz so as to pass frequencies below that (e.g. 0-1 kHz). Depending on the microphone configuration, a different low-pass filter or a different type of filter (e.g. a band-pass filter with a pass-band of 1-3 kHz) may be used.

The filtered signals 33, 34 formed by the filtering unit 24 may be input to beam former 29. The filtered signals 33, 34 are also input to power estimation units 25*a*, 25*d* for calculation of corresponding signal power estimates m1 and m2. These power estimates are applied to spatial voice activity detector SVAD 6*a*. Similarly, signals 35 and 36 from the beam former 29 are input to power estimation units 25*b* and 25*c* to produce corresponding power estimates b1 and b2. Signals 35 and 36 are referred to here as the "main beam" and "anti beam signals respectively. The output signal D1 from spatial voice activity detector 6*a* may be a logical binary value (1 or 0), a logical value of 1 indicating the presence of speech and a logical value of 0 corresponding to a non-speech indication, as described later in more detail. In embodiments of the invention, indication D1 may be generated once for every frame of the audio signal. In alternative embodiments, indication D1 may be provided in the form of a continuous signal, for example a logical bus line may be set into either a logical "1", for example, to indicate the presence of speech or a logical "0" state e.g. to indicate that no speech is present.

Figure 3:
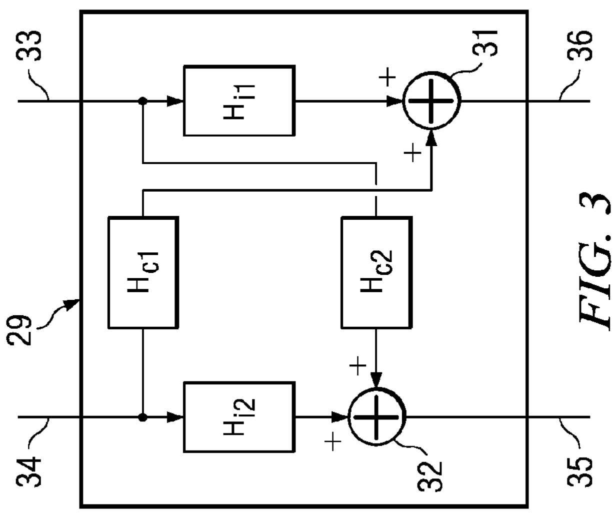
FIG. 3 shows a block diagram of a beam former in accordance with an embodiment of the present invention.

FIG. 3 shows a block diagram of a beam former 29 in accordance with an embodiment of the present invention. In embodiments of the invention, the beam former is configured to provide an estimate of the directionality of the audio signal. Beam former 29 receives filtered audio signals 33 and 34 from filtering unit 24. In an embodiment of the invention, the beam former 29 comprises filters Hi1, Hi2, Hc1 and Hc2, as well as two summation elements 31 and 32. Filters Hi1 and Hc2 are configured to receive the filtered audio signal from the first microphone 1*a* (filtered audio signal 33). Correspondingly, filters Hi2 and Hc1 are configured to receive the filtered audio signal from the second microphone 1*b* (filtered audio signal 34). Summation element 32 forms main beam signal 35 as a summation of the outputs from filters Hi2 and Hc2. Summation element 31 forms anti beam signal 36 as a summation of the outputs from filters Hi1 and Hc1. The output signals, the main beam signal 35 and anti beam signal 36 from summation elements 32 and 31, are directed to power estimation units 25*b*, and 25*c* respectively, as shown in FIG. 2.

Figure 5:
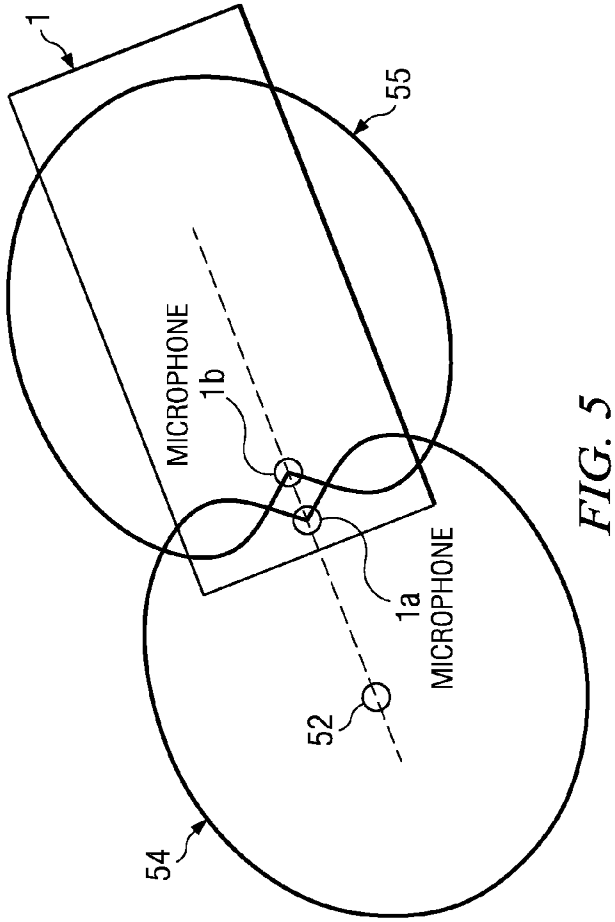
FIG. 5 shows beam and anti beam patterns according to an example embodiment of the invention.

Generally, the transfer functions of filters Hi1, Hi2, Hc1 and Hc2 are selected so that the main beam and anti beam signals 35, 36 generated by beam former 29 provide substantially sensitivity patterns having substantially opposite directional characteristics (see FIG. 5, for example). The transfer functions of filters Hi1 and Hi2 may be identical or different. Similarly, in embodiments of the invention, the transfer functions of filters Hc1 and Hc2 may be identical or different. When the transfer functions are identical, the main and anti beams have similar beam shapes. Having different transfer functions enables different beam shapes for the main beam and anti beam to be created. In embodiments of the invention, the different beam shapes correspond, for example, to different microphone sensitivity patterns. The directional characteristics of the main beam and anti beam sensitivity patterns may be determined at least in part by the arrangement of the axes of the microphones 1*a* and 1*b*.

In an example embodiment, the sensitivity of a microphone may be described with the formula:

$$R(\theta)=(1-K)+K^{*}\cos(\theta) \quad (1)$$

where R is the sensitivity of the microphone, e.g. its magnitude response, as a function of angle θ, angle θ being the angle between the axis of the microphone and the source of the speech signal. K is a parameter describing different microphone types, where K has the following values for particular types of microphone:

K=0, omni directional;

K=½, cardioid;

K=⅔, hypercardiod;

K=¾, supercardiod;

K=1, bidirectional.

In an embodiment of the invention, spatial voice activity detector 6*a* forms decision indication D1 (see FIG. 1) based at least in part on an estimated direction of the audio signal A1. The estimated direction is computed based at least in part on the two audio signals 33 and 34, the main beam signal 35 and the anti beam signal 36. As explained previously in connection with FIG. 2, signals m1 and m2 represent the signal powers of audio signals 33 and 34 respectively. Signals b1 and b2 represent the signal powers of the main beam signal 35 and the anti beam signal 36 respectively. The decision signal D1 generated by SVAD 6*a* is based at least in part on two measures. The first of these measures is a main beam to anti beam ratio, which may be represented as follows:

$$b1/b2 \quad (2)$$

The second measure may be represented as a quotient of differences, for example:

$$(m1-b1)/(m2-b2) \quad (3)$$

In expression (3), the term (m1−b1) represents the difference between a measure of the total power in the audio signal A1 from the first microphone 1*a* and a directional component represented by the power of the main beam signal. Furthermore the term (m2−b2) represents the difference between a measure of the total power in the audio signal A2 from the second microphone and a directional component represented by the power of the anti beam signal.

In an embodiment of the invention, the spatial voice activity detector determines VAD decision signal D1 by comparing the values of ratios b1/b2 and (m1−b1)/(m2−b2) to respective predetermined threshold values t1 and t2. More specifically, according to this embodiment of the invention, if the logical operation:

$$b1/b2>t1 \text{ AND } (m1-b1)/(m2-b2)<t2 \quad (4)$$

provides a logical “1” as a result, spatial voice activity detector 6*a* generates a VAD decision signal D1 that indicates the presence of speech in the audio signal. This happens, for example, in a situation where the ratio b1/b2 is greater than threshold value t1 and the ratio (m1−b1)/(m2−b2) is less than threshold value t2. If, on the other hand, the logical operation defined by expression (4) results in a logical “0”, spatial voice activity detector 6*a* generates a VAD decision signal D1 which indicates that no speech is present in the audio signal.

In embodiments of the invention the spatial VAD decision signal D1 is generated as described above using power values b1, b2, m1 and m2 smoothed or averaged of a predetermined period of time.

The threshold values t1 and t2 may be selected based at least in part on the configuration of the at least two audio input microphones 1*a* and 1*b*. For example, either one or both of threshold values t1 and t2 may be selected based at least in part upon the type of microphone, and/or the position of the respective microphone within device 1. Alternatively or in addition, either one or both of threshold values t1 and t2 may be selected based at least in part on the absolute and/or relative orientations of the microphone axes.

In an alternative embodiment of the invention, the inequality “greater than” (>) used in the comparison of ratio b1/b2 with threshold value t1, may be replaced with the inequality “greater than or equal to” (≧). In a further alternative embodiment of the invention, the inequality “less than” used in the comparison of ratio (m1−b1)/(m2−b2) with threshold value t2 may be replaced with the inequality “less than or equal to” (≦). In still a further alternative embodiment, both inequalities may be similarly replaced.

In embodiments of the invention, expression (4) is reformulated to provide an equivalent logical operation that may be determined without division operations. More specifically, by re-arranging expression (4) as follows:

$$(b1>b2\times t1)\Lambda((m1-b1)<(m2-b2)\times t2)), \quad (5)$$

a formulation may be derived in which numerical divisions are not carried out. In expression (5), “Λ” represents the logical AND operation. As can be seen from expression (5), the respective divisors involved in the two threshold comparisons, b2 and (m2−b2) in expression (4), have been moved to the other side of the respective inequalities, resulting in a formulation in which only multiplications, subtractions and logical comparisons are used. This may have the technical effect of simplifying implementation of the VAD decision determination in microprocessors where the calculation of division results may require more computational cycles than multiplication operations. A reduction in computational load and/or computational time may result from the use of the alternative formulation presented in expression (5).

In alternatives embodiments of the invention, only one of the inequalities of expression (4) may be reformulated as described above.

In other alternative embodiments of the invention, it may be possible to use only one of the two formulae (2) or (3) as a basis for generating spatial VAD decision signal D1. However, the main beam-anti beam ratio, b1/b2 (expression (2)) may classify strong noise components coming from the main beam direction as speech, which may lead to inaccuracies in the spatial VAD decision in certain conditions.

According to embodiments of the invention, using the ratio (m1−b1)/(m2−b2) (expression (3)) in conjunction with the main beam-anti beam ratio b1/b2 (expression (2)) may have the technical effect of improving the accuracy of the spatial voice activity decision. Furthermore, the main beam and anti beam signals, 35 and 36 may be designed in such a way as to reduce the ratio (m1−b1)/(m2−b2). This may have the technical effect of increasing the usefulness of expression (3) as a spatial VAD classifier. In practical terms, the ratio (m1−b1)/(m2−b2) may be reduced by forming main beam signal 35 to capture an amount of local speech that is almost the same as the amount of local speech in the audio signal 33 from the first microphone 1*a*. In this situation, the main beam signal power b1 may be similar to the signal power m1 of the audio signal 33 from the first microphone 1*a*. This tends to reduce the value of the numerator term in expression (3). In turn, this reduces the value of the ratio (m1−b1)/(m2−b2). Alternatively, or in addition, anti beam signal 36 may be formed to capture an amount of local speech that is considerably less than the amount of local speech in the audio signal 34 from second microphone 1*b*. In this situation, the anti beam signal power b2 is less than the signal power m2 of the audio signal 34 from the second microphone 1*b*. This tends to increase the denominator term in expression (3). In turn, this also reduces the value of the ratio (m1−b1)/(m2−b2).

Figure 4A:
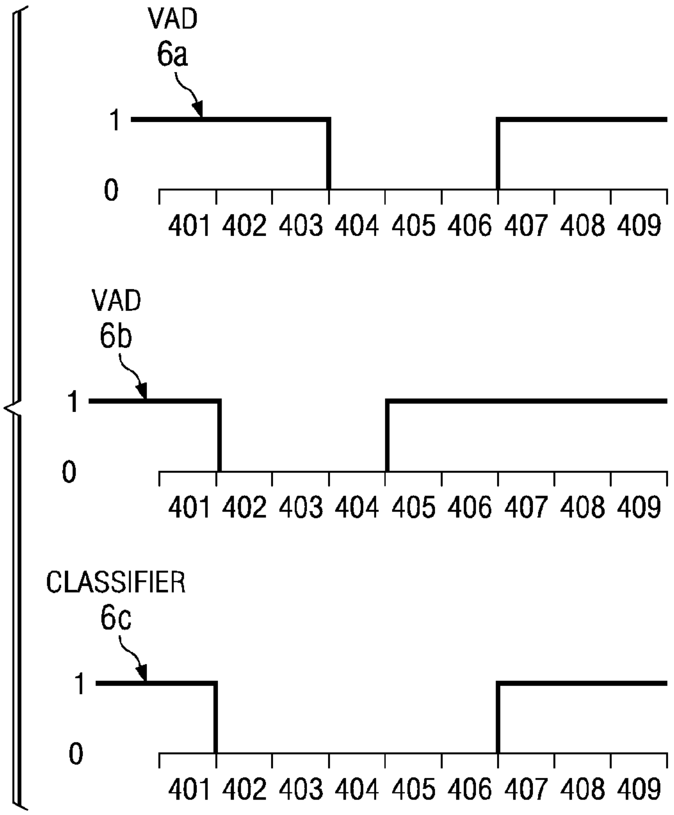
FIG. 4*a* illustrates the operation of spatial voice activity detector 6*a*, voice activity detector 6*b* and classifier 6*c* in an embodiment of the invention.

FIG. 4*a* illustrates the operation of spatial voice activity detector 6*a*, voice activity detector 6*b* and classifier 6*c* in an embodiment of the invention. In the illustrated example, spatial voice activity detector 6*a* detects the presence of speech in frames 401 to 403 of audio signal A and generates a corresponding VAD decision signal D1, for example a logical "1", as previously described, indicating the presence of speech in the frames 401 to 403. SVAD 6*a* does not detect a speech signal in frames 404 to 406 and, accordingly, generates a VAD decision signal D1, for example a logical "0", to indicate that these frames do not contain speech. SVAD 6*a* again detects the presence of speech in frames 407-409 of the audio signal and once more generates a corresponding VAD decision signal D1.

Voice activity detector 6*b*, operating on the same frames of audio signal A, detects speech in frame 401, no speech in frames 402, 403 and 404 and again detects speech in frames 405 to 409. VAD 6*b* generates corresponding VAD decision signals D2, for example logical "1" for frames 401, 405, 406, 407, 408 and 409 to indicate the presence of speech and logical "0" for frames 402, 403 and 404, to indicate that no speech is present.

Classifier 6*c* receives the respective voice activity detection indications D1 and D2 from SVAD 6*a* and VAD 6*b*. For each frame of audio signal A, the classifier 6*c* examines VAD detection indications D1 and D2 to produce a final VAD decision signal D3. This may be done according to predefined decision logic implemented in classifier 6*c*. In the example illustrated in FIG. 4*a*, the classifier's decision logic is configured to classify a frame as a "speech frame" if both voice activity detectors 6*a* and 6*b* indicate a "speech frame", for example, if both D1 and D2 are logical "1". The classifier may implement this decision logic by performing a logical AND between the voice activity detection indications D1 and D2 from the SVAD 6*a* and the VAD 6*b*. Applying this decision logic, classifier 6*c* determines that the final voice activity decision signal D3 is, for example, logical "0", indicative that no speech is present, for frames 402 to 406 and logical "1", indicating that speech is present, for frames 401, and 407 to 409, as illustrated in FIG. 4*a*.

In alternative embodiments of the invention, classifier 6*c* may be configured to apply different decision logic. For example, the classifier may classify a frame as a "speech frame" if either the SVAD 6*a* or the VAD 6*b* indicate a "speech frame". This decision logic may be implemented, for example, by performing a logical OR operation with the SVAD and VAD voice activity detection indications D1 and D2 as inputs.

Figure 4B:
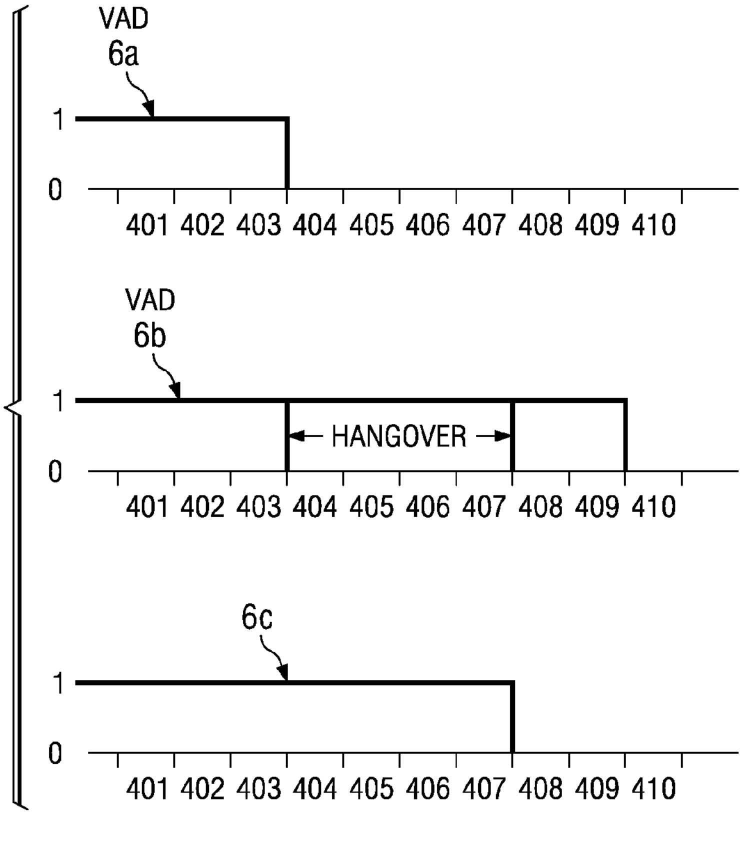
FIG. 4*b* illustrates the operation of spatial voice activity detector 6*a*, voice activity detector 6*b* and classifier 6*c* according to an alternative embodiment of the invention.

FIG. 4*b* illustrates the operation of spatial voice activity detector 6*a*, voice activity detector 6*b* and classifier 6*c* according to an alternative embodiment of the invention. Some local speech activity, for example sibilants (hissing sounds such as "s", "sh" in the English language), may not be detected if the audio signal is filtered using a bandpass filter with a pass band of e.g. 0-1 kHz. In embodiments of the invention, this effect, which may arise when filtering is applied to the audio signal, may be compensated for, at least in part, by applying a "hangover period" determined from the voice activity detection indication D1 of the spatial voice activity detector 6*a*. More specifically, the voice activity detection indication D1 from SVAD 6*a* may be used to force the voice activity detection indication D2 from VAD 6*b* to zero in a situation where spatial voice activity detector 6*a* has indicated no speech signal in more than a predetermined number of consecutive frames. Expressed in other words, if SVAD 6*a* does not detect speech for a predetermined period of time, the audio signal may be classified as containing no speech regardless of the voice activity indication D2 from VAD 6*b*.

In an embodiment of the invention, the voice activity detection indication D1 from SVAD 6*a* is communicated to VAD 6*b* via a connection between the two voice activity detectors. In this embodiment, therefore, the hangover period may be applied in VAD 6*b* to force voice activity detection indication D2 to zero if voice activity detection indication D1 from SVAD 6*a* indicates no speech for more than a predetermined number of frames.

In an alternative embodiment, the hangover period is applied in classifier 6*c*. FIG. 4*b* illustrates this solution in more detail. In the example situation illustrated in FIG. 4*b*, spatial voice activity detector 6*a* detects the presence of speech in frames 401 to 403 and generates a corresponding voice activity detection indication D1, for example logical "1" to indicate that speech is present. SVAD does not detect speech in frames 404 onwards and generates a corresponding voice activity detection indication D1, for example logical "0" to indicate that no speech is present. Voice activity detector 6*b*, on the other hand, detects speech in all of frames 401 to 409 and generates a corresponding voice activity detection indication D2, for example logical "1". As in the embodiment of the invention described in connection with FIG. 4*a*, the classifier 6*c* receives the respective voice activity detection indications D1 and D2 from SVAD 6*a* and VAD 6*b*. For each frame of audio signal A, the classifier 6*c* examines VAD detection indications D1 and D2 to produce a final VAD decision signal D3 according to predetermined decision logic. In addition, in the present embodiment, classifier 6*c* is also configured to force the final voice activity decision signal D3 to logical "0" (no speech present) after a hangover period which, in this example, is set to 4 frames. Thus, final voice activity decision signal D3 indicates no speech from frame 408 onwards.

FIG. 5 shows beam and anti beam patterns according to an example embodiment of the invention. More specifically, it illustrates the principle of main beams and anti beams in the context of a device 1 comprising a first microphone 1*a* and a second microphone 1*b*. A speech source 52, for example a user's mouth, is also shown in FIG. 5, located on a line joining the first and second microphones. The main beam and anti beam formed, for example, by the beam former 29 of FIG. 3 are denoted with reference numerals 54 and 55 respectively. In the illustrated embodiment, the main beam 54 and anti beam 55 have sensitivity patterns with substantially opposite directions. This may mean, for example, that the two microphones' respective maxima of sensitivity are directed approximately 180 degrees apart. The main beam 54 and anti beam 55 illustrated in FIG. 5 also have similar symmetrical cardioid sensitivity patterns. A cardioid shape corresponds to K=½ in expression (1). In alternative embodiments of the invention, the main beam 54 and anti beam 55 may have a different orientation with respective to each other. The main beam 54 and anti beam 55 may also have different sensitivity patterns. Furthermore, in alternative embodiments of the invention more than two microphones may be provide in device 1. Having more than two microphones may allow more than one main and/or more than one anti beam to be formed. Alternatively, or additionally, the use of more than two microphones may allow the formation of a narrower main beam and/or a narrower anti beam.

Without in any way limiting the scope, interpretation, or application of the claims appearing below, it is possible that a technical effect of one or more of the example embodiments disclosed herein may be to improve the performance of a first voice activity detector by providing a second voice activity detector, referred to as a Spatial Voice Activity Detector (SVAD) which utilizes audio signals from more than one or multiple microphones. Providing a spatial voice activity detector may enable both the directionality of an audio signal as well as the speech vs. noise content of an audio signal to be considered when making a voice activity decision.

Another possible technical effect of one or more of the example embodiments disclosed herein may be to improve the accuracy of voice activity detection operation in noisy environments. This may be true especially in situations where the noise is non-stationary. A spatial voice activity detector may efficiently classify non-stationary, speech-like noise (competing speakers, children crying in the background, clicks from dishes, the ringing of doorbells, etc.) as noise. Improved VAD performance may be desirable if a VAD-dependent noise suppressor is used, or if other VAD-dependent speech processing functions are used. In the context of speech enhancement in mobile/wireless telephony applications that use conventional VAD solutions, the types of noise mentioned above are typically emphasized rather than being attenuated. This is because conventional voice activity detectors are typically optimised for detecting stationary noise signals. This means that the performance of conventional voice activity detectors is not ideal for coping with non-stationary noise. As a result, it may sometimes be unpleasant, for example, to use a mobile telephone in noisy environments where the noise is non-stationary. This is often the case in public places, such as cafeterias or in crowded streets. Therefore, application of a voice activity detector according to an embodiment of the invention in a mobile telephony scenario may lead to improved user experience.

A spatial VAD as described herein may, for example, be incorporated into a single channel noise suppressor that operates as a post processor to a 2-microphone noise suppressor. The inventors have observed that during integration of audio processing functions, audio quality may not be sufficient if a 2-microphone noise suppressor and a single channel noise suppressor in a following processing stage operate independently of each other. It has been found that an integrated solution that utilizes a spatial VAD, as described herein in connection with embodiments of the invention, may improve the overall level of noise reduction.

2-microphone noise suppressors typically attenuate low frequency noise efficiently, but are less effective at higher frequencies. Consequently, the background noise may become high-pass filtered. Even though a 2-microphone noise suppressor may improve speech intelligibility with respect to a noise suppressor that operates with a single microphone input, the background noise may become less pleasant than natural noise due to the high-pass filtering effect. This may be particularly noticeable if the background noise has strong components at higher frequencies. Such noise components are typical for babble and other urban noise. The high frequency content of the background noise signal may be further emphasized if a conventional single channel noise suppressor is used as a post-processing stage for the 2-microphone noise suppressor. Since single channel noise suppression methods typically operate in the frequency domain, in an integrated solution, background noise frequencies may be balanced and the high-pass filtering effect of a typical known 2-microphone noise suppressor may be compensated by incorporating a spatial VAD into the single channel noise suppressor and allowing more noise attenuation at higher frequencies. Since lower frequencies are more difficult for a single channel noise suppression stage to attenuate, this approach may provide stronger overall noise attenuation with improved sound quality compared to a solution in which a conventional 2-microphone noise suppressor and a convention single channel noise suppressor operate independently of each other.

Embodiments of the present invention may be implemented in software, hardware, application logic or a combination of software, hardware and application logic. The software, application logic and/or hardware may reside, for example in a memory, or hard disk drive accessible to electronic device 1. The application logic, software or an instruction set is preferably maintained on any one of various conventional computer-readable media. In the context of this document, a "computer-readable medium" may be any media or means that can contain, store, communicate, propagate or transport the instructions for use by or in connection with an instruction execution system, apparatus, or device.

If desired, the different functions discussed herein may be performed in any order and/or concurrently with each other. Furthermore, if desired, one or more of the above-described functions may be optional or may be combined.

Although various aspects of the invention are set out in the independent claims, other aspects of the invention comprise any combination of features from the described embodiments and/or the dependent claims with the features of the independent claims, and not solely the combinations explicitly set out in the claims.

It is also noted herein that while the above describes exemplifying embodiments of the invention, these descriptions should not be viewed in a limiting sense. Rather, there are several variations and modifications which may be made without departing from the scope of the present invention as defined in the appended claims.

What is claimed is:

1. An apparatus comprising:

a first audio input portion comprising a first microphone, and a second audio input portion comprising second microphone;

a first voice activity detector connected to the first microphone, wherein the voice activity detector is configured to make a first voice activity detection decision based at least in part on the voice activity of a first audio signal received from the first microphone;

a second voice activity detector connected to the second microphone, wherein the voice activity detector is configured to make a second voice activity detection decision based at least in part on an estimate of a direction of the first audio signal and an estimate of a direction of a second audio signal received from a second microphone; and a classifier connected to at least one of first and second voice activity detectors, wherein the classifier is configured to make a third voice activity detection decision based at least in part on said first and second voice activity detection decisions.

2. An apparatus according to claim 1, wherein the classifier is adapted to classify the audio signal as speech if both the first and second voice activity detectors detect voice activity in the audio signal.

3. An apparatus according to claim 1, wherein the classifier is adapted to classify the audio signal as speech if either of the first or second voice activity detectors detect voice activity in the audio signal.

4. An apparatus according to claim 1, wherein the classifier is adapted to classify the audio signal as non-speech if the second voice activity detector detects non-speech activity for a predetermined duration of time.

5. An apparatus according to claim 1, wherein the apparatus further comprises a beam former adapted to produce a main beam and anti beam signals calculated from the first audio signal originating from the first microphone and the second audio signal originating from the second microphone, wherein the second voice activity detector is configured to use the main beam and anti beam signals for detecting voice activity based on the direction of the audio signal originating from the first and second microphones.

6. An apparatus according to claim 5, wherein the apparatus further comprises a low pass filter for filtering the first and second audio signals, the low pass filter being configured to provide the low pass filtered digital data to the beam former.

7. An apparatus according to claim 5, wherein the apparatus further comprises a low pass filter for filtering the main and anti beam signals and the first and second audio signals, the low pass filter being configured to provide the low pass filtered signals to a power estimation unit.

8. An apparatus according to claim 1, wherein the first microphone is proximate the second microphone.

9. An apparatus according to claim 1, wherein the first microphone is substantially spaced from the second microphone.

10. An apparatus according to claim 1, wherein the first audio input portion comprises at least two microphones.

11. An apparatus according to claim 1, wherein the second audio input portion comprises at least two microphones.

12. An apparatus according to claim 1, wherein the first microphone comprises a directional microphone or an omni-directional microphone.

13. An apparatus according to claim 1, wherein the second microphone comprises a directional microphone or an omni-directional microphone.

14. An apparatus according to claim 1, wherein the first microphone and the second microphone each comprise a directional microphone or an omni-directional microphone.

15. A method comprising:

making a first voice activity detection decision, with a first voice activity detector, based at least in part on the voice activity of a first audio signal received from a first microphone;

making a second voice activity detection decision, with a second voice activity detector, based at least in part on an estimate of a direction of the first audio signal and an estimate of a direction of a audio signal received from a second microphone; and making a third voice activity detection decision, with a classifier, based at least in part on said first and second voice activity detection decisions.

16. A method according to claim 15, comprising classifying the audio signal as speech if both the first and second voice activity detection decisions indicate the presence of voice activity in the audio signal.

17. A method according to claim 15, comprising classifying the audio signal as speech if either the first or second voice activity detection decisions to indicate the presence of voice activity in the audio signal.

18. A method according to claim 15, comprising classifying the audio signal as non-speech if the second voice activity detection decision indicates no voice activity for a predetermined duration of time.

19. A method according to claim 15, comprising producing a main beam and anti beam signals calculated from the audio signal originating from the first and second microphones, and using the main beam and anti beam signals in the second voice activity detector for detecting voice activity based on the direction of the audio signal originating from the first and second microphones.

20. A non-transitory computer readable, medium embodied with a computer program for detecting voice activity in an audio signal, comprising:

machine readable code for making a first voice activity detection decision based at least in part on the voice activity of a first audio signal received from a first microphone;

machine readable code for making a second voice activity detection decision based at least in part on an estimate of a direction of the first audio signal and an estimate of a direction of a audio signal received from a second microphone; and machine readable coded for making a third voice activity detection decision based at least in part on said first and second voice activity detection decisions.

* * * * *